Sept. 17, 1968  A. M. HALL ETAL  3,401,547
MEASUREMENT AND CONTROL OF ROLLED MATERIAL THICKNESS AND QUALITY
Filed Jan. 26, 1966  2 Sheets-Sheet 1

INVENTORS.
ARNOLD M. HALL &
BY JOHN A. TREVETT their ATTORNEYS

3,401,547
MEASUREMENT AND CONTROL OF ROLLED MATERIAL THICKNESS AND QUALITY
Arnold M. Hall, Noank, and John A. Trevett, Old Lyme, Conn., assignors to General Dynamics Corporation, New York, N.Y., a corporation of Delaware
Filed Jan. 26, 1966, Ser. No. 523,165
7 Claims. (Cl. 72—16)

ABSTRACT OF THE DISCLOSURE

The rolls in a rolling mill are provided with transducers within their cavities by means of which ultrasonic signals are directed from one roll through material being rolled to the second roll. The thickness of the material is sensed by the effect of the material on the ultrasonic signal passing through it.

---

This invention relates to systems for measuring and controlling the thickness of a material being rolled, such as steel sheet or strip and, more particularly, to a new and improved system for measuring and controlling material thickness more conveniently and with greater accuracy.

Heretofore, it has not been possible to measure directly the thickness of a strip or sheet of steel at the time it is rolled, i.e., to measure the actual width of the gap between the working rolls of the mill stand. Instead, the thickness of the material being rolled has been determined indirectly, such as by measuring the preset roll gap and computing the change resulting from deflection of the stand as the material passes through it. Direct thickness measurements have only been made before or after the strip of material passes between the working rolls of the stand. In the case of indirect measurements, the accuracy of measurement is limited by any eccentricities or irregularities in the shape of the working rolls or their bearings or in the flexing of the stand, and the speed of response of a control system must be reduced to avoid the influence of such irregularities. Where direct measurement of the material thickness is made, there is necessarily a lag between the detection of a variation in input or output thickness and the application of a corrective measure to overcome the variation. Moreover, the types of thickness measuring devices used heretofore have been subject to inherent rolling mill hazards and require elaborate protective arrangements or have high replacement rates.

Accordingly, it is an object of the present invention to provide a new and improved system for measuring and controlling the thickness of the material being rolled which eliminates the above-mentioned disadvantages of present systems.

Another object of the invention is to provide a new and improved system for measuring accurately the thickness of the material being rolled at the time of rolling.

A further object of the invention is to provide a new and improved apparatus for measuring material thicknesses.

An additional object of the invention is to provide a system of the above character which also monitors the quality of the material being rolled.

These and other objects of the invention are attained by providing an ultrasonic transducer acoustically coupled through a material-engaging roll to the material being rolled and arranged to direct ultrasonic signals through the roll into the material. For measurement of the material thickness at the time of rolling, an ultrasonic transducer is mounted within one of the working rolls and is coupled through the working roll to the material being rolled. Preferably, several transducers, distributed along the axial length of the roller, are included so as to provide indications of the uniformity of the thickness and also the quality of the material across the entire width of the material being rolled. To measure thickness or monitor quality before or after rolling, an ultrasonic transducer is mounted within another material-engaging roll, such as a tensioning roll, which is urged against the material so as to provide good acoustic coupling.

In one form of apparatus according to the invention, a series of ultrasonic transducers is held in axially spaced, angularly fixed position with a central cavity in a material-engaging roll, the angular position being such as to direct ultrasonic signals toward the material engaged by the roll. In an alternative arrangement, the transducers are affixed to the roll so as to rotate with it and signals are applied to and received from the transducers through a slip ring arrangement. When thickness is being measured at the time of rolling, the second working roll may also include a series of ultrasonic transducers to detect pulses transmitted through the material.

Further objects and advantages of the invention will be apparent from a reading of the following description taken in conjunction with the accompanying drawings, in which.

Figure 1:
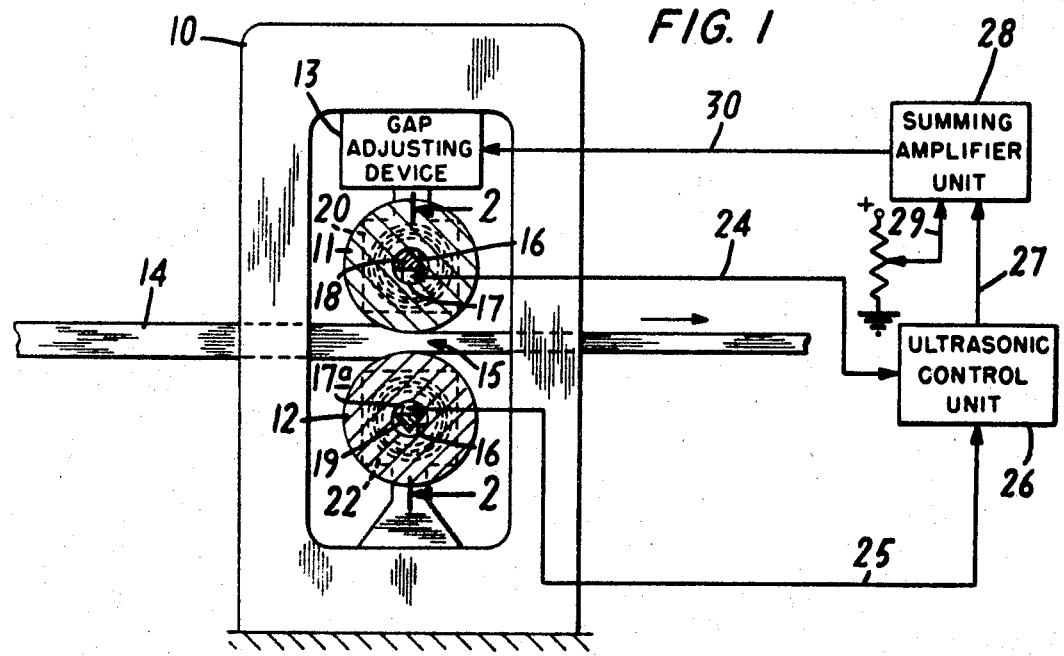
FIG. 1 is a schematic illustration, partly in section, showing a representative thickness measurement and control system according to the invention.

In the representative embodiment of the invention illustrated schematically in FIG. 1, a rolling mill stand 10 having two vertically spaced working rolls 11 and 12 rotatably supported therein includes a gap adjusting device 13 adapted to vary the nominal setting of the gap or separation between the working rolls 11 and 12, the upper roll 11 being vertically movable within the stand 10. The gap adjusting device may comprise any conventional electrically controlled apparatus, such as a screwdown arrangement, for example. A strip 14 of material to be rolled passes between the working rolls and its thickness is reduced in proportion to the setting of the roll gap 15 and other factors, such as the compliance of the mill stand.

Figure 2:
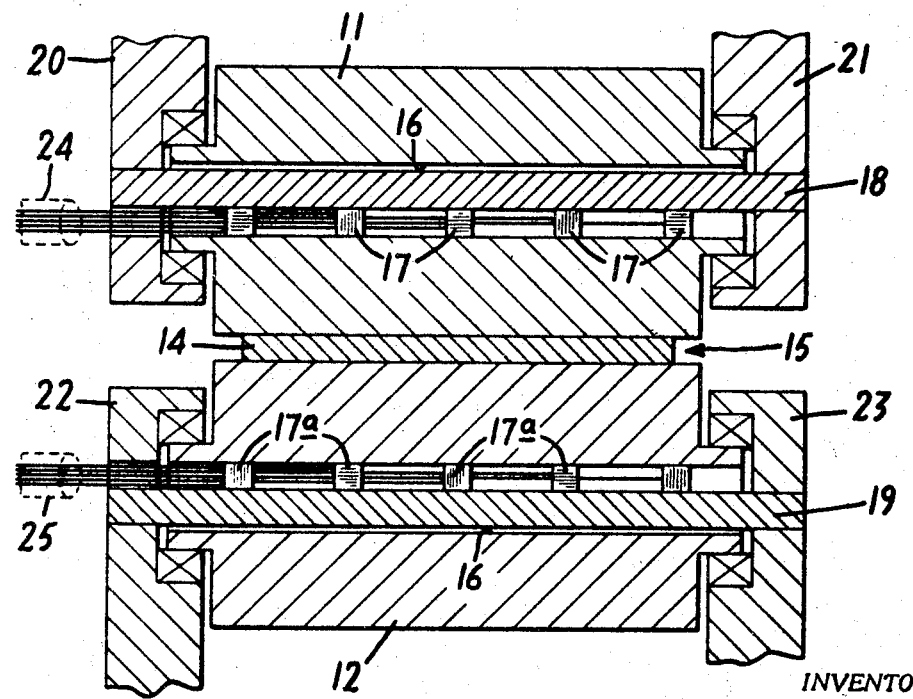
FIG. 2 is an enlarged fragmentary sectional view taken on the line 2—2 of FIG. 1 and looking in the direction of the arrows.

Each of the working rolls 11 and 12 has a concentric cylindrical cavity or hole 16 and, in accordance with the invention, a plurality of ultrasonic transducers 17, 17a is supported within the hole as shown in FIG. 2, by support arms 18 and 19, respectively. As best illustrated in the sectional view of FIG. 2, the support arm 18 is attached to the end bearing supports 20 and 21 for the upper working roll 11 so as to hold the transducers 17, 17a in angularly fixed position but in sliding contact with the inner surface of the working roll 11 directly opposite to the roll gap 15. Similarly, the lower working roll 12 has bearing support members 22 and 23 in which the transducer support arm 19 is mounted so as to hold the transducers 17a which are affixed there to against the inner roll surface in line with the roll gap 15. Preferably, the inner surfaces of the working rolls 11 and 12 are covered with a semi-fluid lubricant material, such as a grease, to reduce friction and, at the same time, assure good acoustic coupling between the transducers 17, 17a and the working rolls. If desired, the transducers 17, 17a may be spaced farther away from the inner surfaces of the working rolls; if acoustic wave focusing techniques are utilized. In this case, the hole 16 should be filled with a substantial quantity of a coupling agent such as oil or grease to provide coupling between the transducers and the roll.

Each of the ultrasonic transducers 17, 17a comprises a conventional piezoelectric or other electrostrictive element adapted to convert electrical signals into sonic signals of corresponding frequency and the various transducers are connected through corresponding cables 24 and 25 to an ultrasonic control unit 26. The unit 26 supplies electrical signals selectively to each of the transducers and responds to electrical signals generated therein so that the thickness of the strip 14 at the location of each of the transducers is accurately determined at the time the material is being rolled. The thickness determination may be made in any conventional manner as described hereinafter and a corresponding signal is sent on a line 27 to a summing amplifier unit 28 for comparison with a signal representing a desired thickness value which is applied at an input 29. As a result of this comparison, a control signal is generated and transmitted through a line 30 to the gap adjusting device 13 in accordance with any deviations of the measured strip thickness from the desired thickness.

According to one mode of operation, the ultrasonic signals applied by the transducers 17 are in the form of pulses and after the transmission of each pulse the transducers are operated as receivers. In this case, the time interval between the receipt of pulses reflected from the two surfaces of the material provides an indication of the thickness of the material. This mode permits the use of any of the known methods of shaping and controlling pulses for ultrasonic measurements to provide improved precision, resolution, and/or noise rejection. The requirements of the application for accuracy and range of thickness measurements will determine which of these methods will be chosen. In another mode of operation, the time interval for transmission of an ultrasonic pulse between the transducers 17 and 17a may be measured to determine the thickness of the material in the gap 15.

According to the preferred embodiment of the invention illustrated in the drawings, the thickness of the material 14 is measured at a plurality of locations across its width to assure uniformity of thickness. Furthermore, since undesired internal irregularities or inhomogeneities of the material in the strip will act as reflectors or scatterers of the ultrasonic waves applied thereto, distribution of a plurality of transducers across the width of the strip, as shown in FIG. 2, provides a good arrangement for monitoring the quality of the material being rolled.

In a different mode of operation, only one set of transducers is used. In this case, ultrasonic signals generated in the transducers 17 (or 17a) are directed through the roll 11 to the strip of material 14 and the frequency of these signals is varied until it is such as to produce standing waves between the two surfaces of the material adjacent to the roll. When this resonant condition occurs, ultrasonic energy reflected back to the transducers 17 (or 17a) produces a substantial increase in the radiation resistance or damping of the signal. The frequency at which standing waves are produced is directly related to the thickness of the material 14 and a corresponding signal is generated within the control unit 26 for comparison in the summing amplifier 28 with the desired thickness value. If any adjustment of the gap is necessary, a corresponding signal is transmitted through the line 30 to the adjusting device 13.

In another mode of operation, both sets of transducers are utilized. For example, the transducers 17 are energized in the manner described above and the transducers 17a within the roll 12 are used as ultrasonic signal detectors. The frequency of the signals applied to the transducers 17 is varied until the transducers 17a detect a minimum signal indicating that standing waves have been produced between the surfaces of the material 14 in the gap 15.

Figure 3:
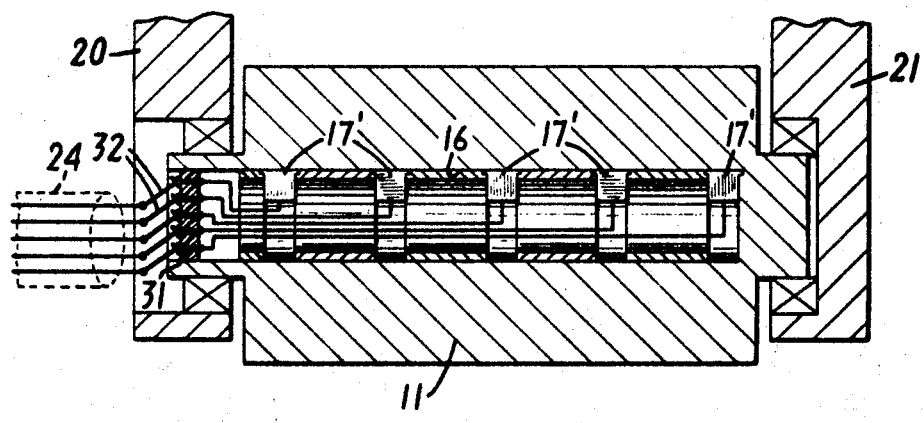
FIG. 3 is a view in longitudinal section similar to that of FIG. 2, showing an alternative arrangement.

In the modified arrangement shown in FIG. 3, a series of ultrasonic transducers 17' is affixed to the roll 11 so as to rotate with it. Each of the transducers 17' is connected to a corresponding slip ring in a disk 31 mounted at one end of the roll cavity 16. A corresponding series of brushes 32 connected to the conductors of the cable 24 engages the slip rings on the outer surface of the disk 31. When this arrangement is used, the operation of the system is timed so as to coincide with the positioning of the transducers 17' adjacent to the material being measured. If desired, one or more additional series of transducers may be mounted in fixed position within the roll at orientations which are angularly spaced from that of the transducers 17' so as to enable more frequent measurements.

Figure 4:
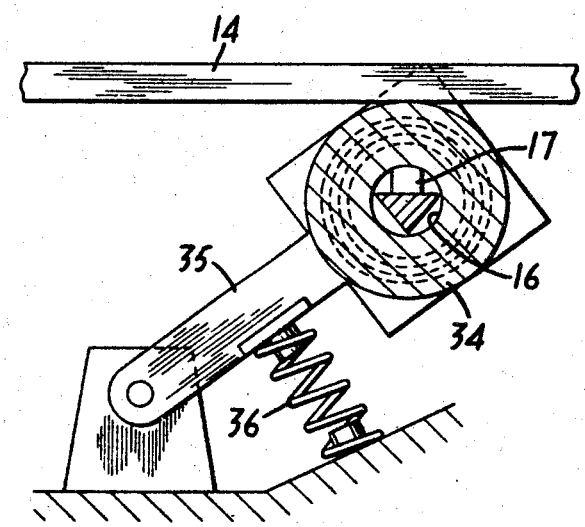
FIG. 4 is an illustration of another thickness measuring arrangement according to the invention.

When it is desired to measure the thickness of a strip 14 at a time other than during rolling, the transducers 17 may be mounted in the central cavity of another material-engaging roll such as the tensioning roll 34 shown in FIG. 4. For best results, the strip 14 must be very smooth and should be well lubricated and under high tension as in cold rolling mills. The roll 34 is rotatably mounted on a pivoted arm 35 and is urged toward the strip 14 by a spring 36.

Although the invention has been described herein with reference to a specific embodiment, many modifications and variations therein will readily occur to those skilled in the art. Accordingly, all such variations and modifications are included within the intended scope of the invention as defined by the following claims.

We claim:
1. A method for monitoring a material being rolled comprising directing ultrasonic signals through one working roll in a rolling mill and detecting the effect of the material on the ultrasonic signals from within a second working roll in the rolling mill to detect the thickness of the material as it is rolled.

2. Apparatus for monitoring a material being rolled comprising a pair of roll means adapted to pass the material between them and having an internal cavity in one of them, ultrasonic transducer means disposed within the roll means cavity and arranged to direct ultrasonic signals through the roll means at the angular position of the roll means which is adapted to contact the material, and means for detecting said ultrasonic signals.

3. Apparatus according to claim 2 wherein the roll means comprises a first working roll of a rolling mill stand and including a second working roll having a cavity and disposed within the stand in pressure contact with the material being rolled on the opposite side thereof from the first working roll, and wherein said detecting means comprises further ultrasonic transducer means disposed within the second working roll to sense ultrasonic signals passing through the material.

4. Apparatus according to claim 3 including adjusting means for adjusting the separation of the first and second working rolls in the stand and control means for controlling the operation of the adjusting means in response to ultrasonic signal determinations.

5. Apparatus according to claim 2 wherein the transducer means comprises a plurality of ultrasonic transducers disposed in longitudinally spaced relation within the cylindrical cavity so as to be spaced across the width of a material being rolled.

6. Apparatus according to claim 2 wherein the transducer means is held in angularly fixed position within the roll cavity and directed toward the angular position at which the material engages the roll means.

7. Apparatus according to claim 2 wherein the transducer means is affixed to the roll means so as to rotate therewith and including slip ring means to provide external connection to the transducer means.

References Cited

UNITED STATES PATENTS

| | | | |
|---|---|---|---|
| 2,431,234 | 11/1947 | Rossweiler et al. | 73—67.8 |
| 2,653,247 | 9/1953 | Lundahl | 72—16 |
| 2,661,714 | 12/1953 | Greenwood et al. | 73—67.8 |
| 2,889,705 | 6/1959 | Hanysz et al. | 73—67.5 |
| 3,006,184 | 10/1961 | Goldman | 73—67.8 |
| 3,074,267 | 1/1963 | Martin | 73—67.5 |
| 3,315,520 | 4/1967 | Carnevale et al. | 73—67.5 |

FOREIGN PATENTS

| | | |
|---|---|---|
| 39,671 | 3/1957 | Poland. |
| 892,692 | 10/1953 | Germany. |
| 205,913 | 7/1966 | Sweden. |

CHARLES W. LANHAM, *Primary Examiner.*

A. RUDERMAN, *Assistant Examiner.*